Sept. 2, 1924.

J. BRUNGESS

TRACTOR HITCH

Filed Dec. 30, 1922

1,507,155

Inventor,
John Brungess,
By Marks Akkleman,
Attorney

Patented Sept. 2, 1924.

1,507,155

UNITED STATES PATENT OFFICE.

JOHN BRUNGESS, OF UKIAH, CALIFORNIA.

TRACTOR HITCH.

Application filed December 30, 1922. Serial No. 609,982.

*To all whom it may concern:*

Be it known that I, JOHN BRUNGESS, a citizen of the United States of America, and resident of Ukiah, in the county of Mendocino and State of California, have invented certain new and useful Improvements in a Tractor Hitch, of which the following is a specification.

This invention relates to tractor hitches, and particularly to a device interposed between a tractor and a load for permitting a relatively free movement of the tractor with respect to the load when the tractor is being turned.

The invention has for an object particularly, the provision of novel means for connecting a plow to a tractor in order that when turning, the tractor will have latitude of movement which will not be communicated to the plow until the tractor has made some headway in turning, it being the purpose of the inventor to produce a connection between the tractor and the plow which will permit the tractor to move somewhat independently of the plow so that the plow may be manipulated by an operator for moving it into proper position for movement in a direction different from that traveled prior to the turning of the tractor.

It is a further object of the invention to produce a connection of the character indicated which will permit the tractor to back for a limited distance without communicating its motion to the plow; and the said invention further contemplates the provision of novel means whereby universal movement is effected between the plow and the interposed element that is connected to the tractor.

It is a still further object of this invention to produce specifically a truck which is interposed between the plow and the tractor in order that the truck may be turned independently of the plow to a limited degree, thus making the connection between the plow and the tractor flexible, yet of a character to withstand the strain and hardships incident to its use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
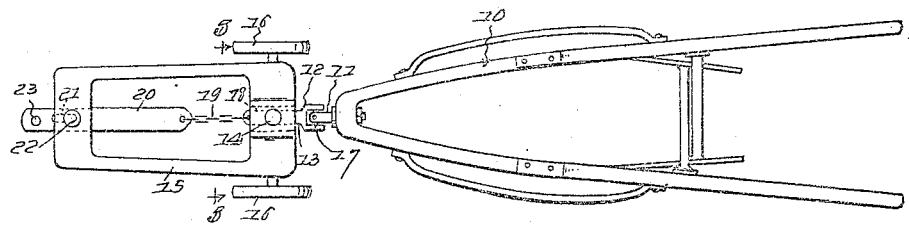
Figure 1 illustrates a plan view of a plow and tractor connection embodying the invention.
Figure 2:
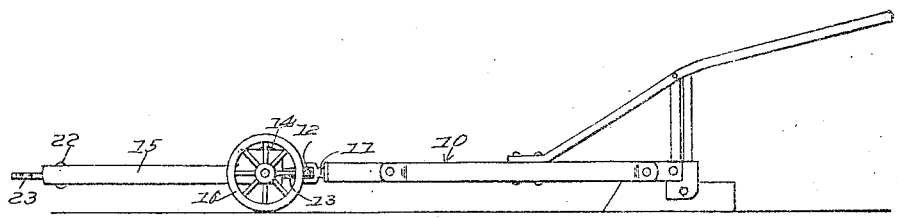
Figure 2 illustrates a side elevation thereof.
Figure 3:
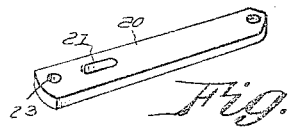
Figure 3 illustrates a perspective view of the draw bar.
Figure 4:
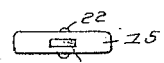
Figure 4 illustrates an end view of the truck frame with parts omitted.
Figure 5:
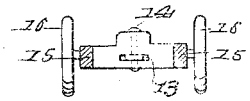
Figure 5 illustrates a sectional view on the line 5—5 of Fig. 1.

In these drawings, 10 denotes a plow which may be of any conventional type, and therefore, it will not be described in detail.

The plow has an arm 11 projecting from its forward end that is connected to a coupling 12 of a bar 13, and this bar 13 is oscillatably mounted on a pivot 14 of the truck frame 15, the said truck frame being mounted on wheels 16.

The joint 17 between the coupling 12 and the arm 11 is of a construction that permits vertical and horizontal oscillatory movement between the plow and the truck in order that the truck may turn without communicating motion to the plow, and in order too that the rise and fall of the truck when traveling over uneven surfaces will not tend to elevate the front end of the plow.

The end of the bar 13 remote from the coupling has an aperture 18 to which a flexible element 19 such as a chain is connected, and the said chain has a draw bar 20 connected to it, the said draw bar having a slot 21 which is slidable in the frame and with relation to a pin 22 which limits the movement of the draw bar, it being understood that the said draw bar is slidable in the frame in order that it may have some movement independently of the frame, as will presently appear.

The outer end of the draw bar may be connected to a tractor in any appropriate manner, and to that end, it is provided with an aperture 23 which may receive any appropriate type of coupling.

From an inspection of the drawing, it will be apparent that if the tractor turns to the right or left, it will cause the truck to turn, but that the truck may turn somewhat independently of the plow and without communicating motion to it until a pull is exerted thereon which is in a direction practically at right angles to the length of the plow. This permits the tractor to turn at the end of a field or at the end of a run and enable an operator to manipulate the plow to better advantage. Furthermore, owing to the slidable mounting of the draw bar, the tractor may travel rearwardly to a limited degree without communicating motion to the truck or otherwise interfering with its position until such time as the tractor has been brought into proper or desired position for moving the truck in the correct direction.

I claim:

1. In a tractor hitch, a truck, a draw bar extending from the forward end thereof, means for slidably securing the draw bar to the truck, a draw bar at the rear of the truck, a flexible connection between the two draw bars, and a loose joint between the truck and load.

2. In a tractor hitch, a truck, a rear draw bar connected thereto, a plow, an arm extending from the plow, a joint between the plow and the draw bar having vertical and horizontal oscillatory motion, a front draw bar connected to the first mentioned draw bar, means for slidingly securing the front draw bar to the truck, and a flexible connection between the two draw bars.

JOHN BRUNGESS.